(12) United States Patent
Voigt et al.

(10) Patent No.: US 6,255,812 B1
(45) Date of Patent: Jul. 3, 2001

(54) SHEARBAR/CUTTERHEAD MONITORING SYSTEM WITH SPATIALLY SEPARATED MAGNET

(75) Inventors: Burkhard Voigt; Hagen Schaefer, both of Mannheim; Markus Braun, Mesbach, all of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/271,755

(22) Filed: Mar. 18, 1999

(30) Foreign Application Priority Data

Mar. 20, 1998 (DE) .............................................. 198 12 271

(51) Int. Cl.$^7$ ..................................................... G01B 7/14
(52) U.S. Cl. ................................. 324/207.26; 324/207.15; 340/66
(58) Field of Search ..................... 324/207.26, 207.24, 324/207.25, 207.15, 207.12, 207.16, 660, 662, 15, 239, 240; 340/684, 679, 519, 66; 241/37, 222

(56) References Cited

U.S. PATENT DOCUMENTS

| | | | |
|---|---|---|---|
| 3,641,431 | 2/1972 | Pigage et al. ......................... | 324/662 |
| 3,967,064 | 6/1976 | Sigworth ............................... | 381/949 |
| 4,198,006 | * 4/1980 | Rolfe ..................................... | 241/222 |
| 4,412,212 | * 10/1983 | Kolegraff et al. ................... | 340/684 |
| 5,018,342 | * 5/1991 | McClure et al. ...................... | 56/10.5 |
| 5,030,910 | * 7/1991 | Jinge et al. ..................... | 324/207.15 |

FOREIGN PATENT DOCUMENTS

| | | |
|---|---|---|
| 29 43 834 | 5/1980 | (DE) . |
| 0072016 | 8/1982 | (EP) . |
| 0 170 709 A1 | 2/1986 | (EP) . |
| 0291216 | 5/1988 | (EP) . |
| 0679330 | 5/1988 | (EP) . |
| 0684454 | 5/1995 | (EP) . |
| 0 684 454 A1 | 11/1995 | (EP) . |
| 0 896 205 A1 | 2/1999 | (EP) . |
| 2559261 | 11/1984 | (FR) . |

\* cited by examiner

Primary Examiner—Christine Oda
Assistant Examiner—Subhash Zaveri (57) ABSTRACT

A system for monitoring a distance between a relatively movable magnetically conductive shearbar and a magnetically conductive cutterhead in a forage harvester includes a permanent magnet and an induction coil which generates an electric signal corresponding to the distance and which is supplied to an evaluation circuit. The evaluation circuit separates the signal generated by the induction coil into a high frequency component and a low frequency component and forms a quotient therefrom.

22 Claims, 8 Drawing Sheets

SHEARBAR/CUTTERHEAD MONITORING SYSTEM WITH SPATIALLY SEPARATED MAGNET

BACKGROUND OF THE INVENTION

The invention pertains to a system for monitoring the distance between a first and a second magnetically conductive part which are movable relative to one another, in particular, between a knife of a rotating cutterhead and a shearbar of a harvesting machine with at least one permanent magnet and one induction coil for generating an electric signal corresponding to the distance, which is supplied to an evaluation circuit, as well as a forage harvester with such a device.

It is desirable to monitor the distance between cutterhead knives and a shearbar in a forage harvesters, because this distance strongly affects power consumption. Several possibilities for measuring the distance between cutterhead knives and a shearbar are known. For example, in U.S. Pat. No. 3,646,421 capacitive sensors determine the capacitance between the knives and shearbars. In such a system a high voltage is necessary and consequently, the knives and shearbars must be electrically insulation from each other. Also, the capacitance may vary due to conditions other than a change in the distance between knife and shearbar. For example, a change in the nature of the material to be cut, and/or a change in dampness, can lead to capacitance fluctuations.

In EP-A-0,291,216 an acoustic knock sensor is proposed. It records the mechanical contacts of knife and shearbar. In the process, the "knock signals" are converted into digital signals. In order to permit a parallel positioning of the terminal edges of the knife and the shearbar, the two ends of the shearbar can be alternately moved up to the knife.

Other methods are based on a current measurement, as shown, for instance, in EP-A-0,679,330. When a constant supply voltage is applied, a current flows through the shearbar and a motor device which changes the position of the shearbar, a contact between a knife and the shearbar can be detected on the basis of a change in the current amplitude, since the ohmic resistance changes in this case. In case the current amplitude lies above or below prescribed limits within a given time interval, the operation of the motor is interrupted. In keeping with DE-OS-3,345,749, it is also possible to perform the distance measurement on the basis of a voltage breakdown between the shearbar and the knives. For this purpose, a high voltage is necessary.

In DE-A3,535,902, an optoelectronic sensor of distance measurement is proposed.

Additionally, the use of inductive sensors is known. These operate in two known manners. In the first design, incipient eddy currents are measured on the moved object. Inductive fields of very low strength are involved here. In the second, and more frequently employed design, also used in the present invention, induction coils are placed on the shearbar, in which a voltage is induced if existing magnetic fields are interrupted by the mutual motion of knives and the shearbar, as is shown, for instance, in EP-A-0,072,016 and U.S. Pat. No. 4,198,006. The large magnetic fields required for this are generated by one or more permanent magnets which are housed in the shearbar. The magnetic fields generated by the permanent magnet or magnets must be considerably larger than the magnetic fields generated by the intrinsic magnetization of the knives. The signals are dependent on the gap width and the velocity with which the knives pass the shearbar. It is possible with electronic integration devices to obtain a signal dependent on this velocity and to trigger the proximity sensors individually, insofar as several proximity sensors arranged along the shearbar. With an appropriate electronic signal evaluation, it is in principle possible to monitor whether knives are missing or broken off.

A problem with such a known system is that the induction coils are housed in the shearbar and consequently become worn or damaged if the shearbar is damaged. The permanent magnet or magnets are normally recessed in the shearbar and are embedded in plastic in order to avoid magnetic short circuits. This plastic housing becomes an additional wearing part. The embedding of the permanent magnet(s) and sensor coil(s) in the shearbar further reduces the mechanical stability of the shearbar, since a correspondingly large depression must be milconnected in the shearbar. Finally, a deterioration of the quality of the permanent magnets has an unfavorable effect on the sensitivity of the distance measurement.

SUMMARY OF THE INVENTION

An object of the present invention is to provide a system for monitoring cutterhead/shearbar distance wherein the induction coils are less subject to wear and damage.

Another object of the present invention is to provide such a system for monitoring cutterhead/shearbar distance wherein the shearbar has improved mechanical stability.

Another object of the present invention is to provide such a system wherein a deterioration of the quality of the permanent magnets has a reduced unfavorable effect on the sensitivity of the distance measurement.

Another object of the present invention is to provide such a system wherein which is less susceptible than conventional mechanical sensor devices to malfunction due to mechanical influences.

These and other objects are achieved by the present invention wherein a system for monitoring the distance between a shearbar and the knife of a rotating cutterhead includes permanent magnets and induction coils. The magnets are spaced apart from and exterior with respect to the coils. The permanent magnets create a magnetic field which extends into an area through which the cutterhead knives move as the cutterhead rotates. Movement of the cutterhead knives through the magnetic field causes a change in the magnetic flux density in area of the induction coil, and induces a voltage in the coil. This voltage depends on the velocity of the knife and its distance from the shearbar. In case several rows with knives are arranged along the shearbar, a separate signal depending on the mutual distance between the knives and the shearbar is provided via an evaluation circuit for each row and each knife. The separation between permanent magnet(s) and the coil has the advantage that the induction coil and electronic components directly connected to it need not be housed in the area of the cutting edge of the shearbar and are thus no longer subject to wear. For instance, the induction coil can be fastened to the shearbar bed on the side of the shearbar opposite to the cutting surface. In principle, several induction coils can be employed simultaneously, e.g., opposite each row of knives or one induction coil can be used for several magnets and knife rows.

The induction coil generates voltage signals or pulses which are applied to an evaluation circuit. The evaluation circuit includes an amplifier which can also be cast together with the induction coil so that there are no long connection wires and the effect of outside electromagnetic radiation is reduced. The evaluation circuit also separates the amplified signals into a high and a low frequency components and forms a quotient therebetween. In forming the quotient, either component can be divided by the other. The separation into high and low frequency signal components increases the sensitivity of the measurement of changes in the distance between knives and shearbar. While the low frequency signal component is received almost unchanged in case of changes of distance, the high frequency component is inversely proportional to the distance between knives and shearbar. It can therefore provide a precise and, in principle, accurate distance measurement. Furthermore, changes of the stationary magnetic field due to, for instance, a deterioration of the magnetic characteristics of the permanent magnet act by the same factor on both high and low frequency signal components, so that a more precise distance measurement becomes possible due to the quotient formation.

To insure that a sudden magnetization of the knives, for instance, in case of a collision, has no influence on the distance measurement, the intrinsic magnetization of the knives and their mounts is canceled by at least one permanent magnet. To that end, either a magnet is recessed into the middle of the side surface of the shearbar which the knives pass by such that the magnet is not surrounded on all sides by the material of the shearbar, or several magnets are arranged a slight distance from the cutting edge on the shearbar or recessed into it, such that they are not surrounded on all sides by the material of the shearbar. Because the magnets have freely exposed surfaces, the danger of a magnetic short circuit is eliminated and the magnetic field generated by the magnets in the outer area of the shearbar is sufficiently large to be able to neglect magnetic field changes of the knives. In order that the magnets not suffer any damage, in case of damage to the shearbar, for instance, from a collision with the knives, they are normally recessed into the shearbar such that their exposed surfaces are recessed slightly inwards with respect to the cutting edge. When several magnets are used, it is preferable to arrange at least three magnets per knife or knife row on or under the shearbar along its longitudinal axis a slight distance from the cutting edge. In order not to hamper the flow of material, the magnets can be fully or partially recessed in the shearbar. In order to protect the exposed magnets from acids and moisture, they can be embedded in suitable acid-resistant plastics. An arrangement of the permanent magnets on top of the shearbar provides, in principle, a better signal than the arrangement of the permanent magnets underneath the shearbar.

The evaluation circuit preferably permits changing the cutoff frequencies for high and low pass filtering. The high and low frequencies of interest for signal evaluation depend on the relative velocity between the knives and the shearbar. Therefore, the cutoff frequencies should be set separately for each relative velocity between knives and shearbar. If the relative velocity changes by a certain factor, then the cutoff frequencies should be multiplied by the same factor. In that way, an approximately constant sensitivity of the evaluation circuit to changes of distance at differing relative velocities is guaranteed.

The high and low frequency signal components are filtered out by means of band-pass filters. In that way, first of all, very low frequency noise components can be suppressed and interference due to coupling of very high frequency signal in the radio-frequency spectrum can be prevented. In order to clearly cut off the filtered-out frequency range, filters of higher order can come into use.

In the evaluation circuit, the filtered-out high and low frequency signals are stored in a peak value memory, the storage being initiated with a switch that is operated in synchronization with the voltage pulses. Since the amplified and filtered voltage pulses charge capacitors it is necessary for a fast signal evaluation to discharge the capacitors so quickly that an incoming pulse is not covered by the previous stored pulse. It is preferable to control of the charging and discharging process with switches, as opposed to continuous discharging of the capacitors via resistors.

The evaluation circuit includes an analog or digital divider which forms an analog or digital quotient. This has the advantage that changes, for instance, of the magnetization of the permanent magnet or magnets are suppressed in the signal evaluation, since high and low frequency signal component change by the same factor. The output voltage of the divider is then compared to a voltage adjusted, for instance, by a potentiometer. This can be selected such that it corresponds to a minimum permissible distance between knives and shearbar.

If the output voltage of the analog divider exceeds the comparison voltage, a warning device, consisting, for instance, of a light-emitting diode or of a loudspeaker, is activated.

The device monitoring the distance between the shearbar and the cutter elements of a cutting device movable relative to it preferably finds application in forage harvester. In this case, the distance of the knives located on a cutterhead from the shearbar is checked with the monitoring device.

Since a cutterhead of a forage harvester generally features several rows of knives, a sensor unit consisting of permanent magnet(s) and induction coil is arranged opposite each knife row, consisting of several knives. Because, however, the induction coil can be arranged separately from the permanent magnet or magnets along the shearbar, it is also conceivable with sufficiently strong magnets to use only one sensor device insofar as all knives pass the sensor device offset in time. This would bring clear material and cost savings.

DESCRIPTION OF THE PREFERRED EMBODIMENT

Figure 8:
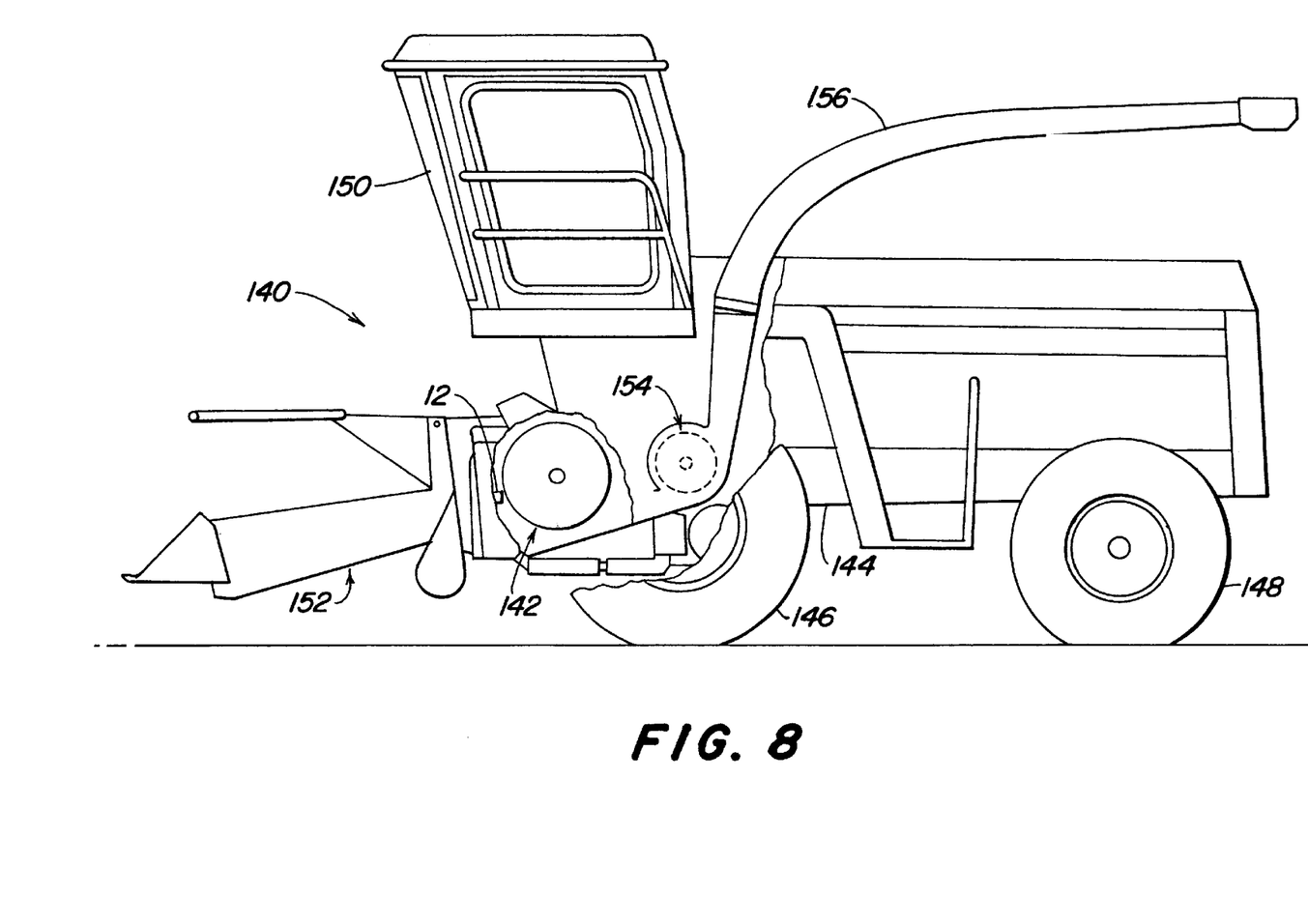
FIG. 8 is side view a forage harvester showing its cutterhead and shearbar.

FIG. 8 shows a self-propeled forage harvester 140 with a cutterhead 142 and a shearbar 12. The forage harvester 140 is constructed on a frame 144, which is supported by front and rear wheels 146 and 148. The forage harvester 140 is operated from a driver's cab 150, from which a harvest material intake device 152 can be viewed. Material picked up from the ground by the harvest material intake device 152 such as corn, grass or the like is supplied to the cutterhead 142. Along the cutterhead 142, a shearbar 12 is located. The conveyed material is chopped into small pieces and put onto the conveyor device 154. The material leaves the forage harvester 140 via a rotating output shaft 156 to a wagon traveling alongside. Further details of the conventional forage harvester 140 are not described because they are well known.

Figures 1A, 1B:
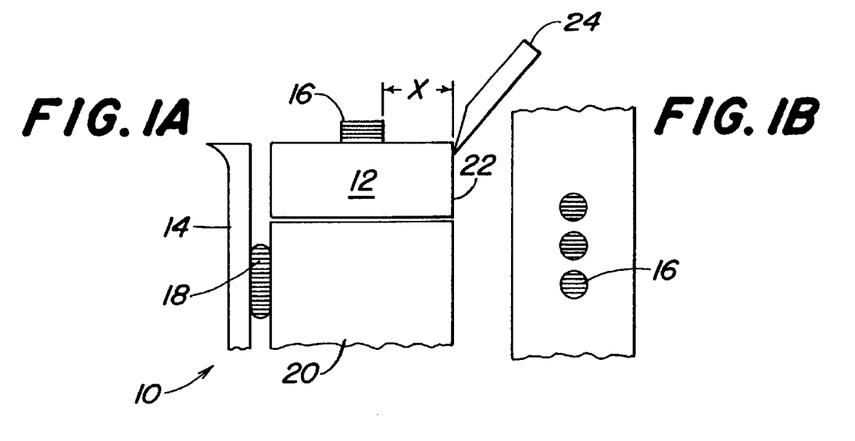
FIG. 1A is sectional view a shearbar assembly with permanent magnets and an induction coil.
FIG. 1B is view in the direction of arrows 1B—1B of FIG. 1A.
Figure 9:
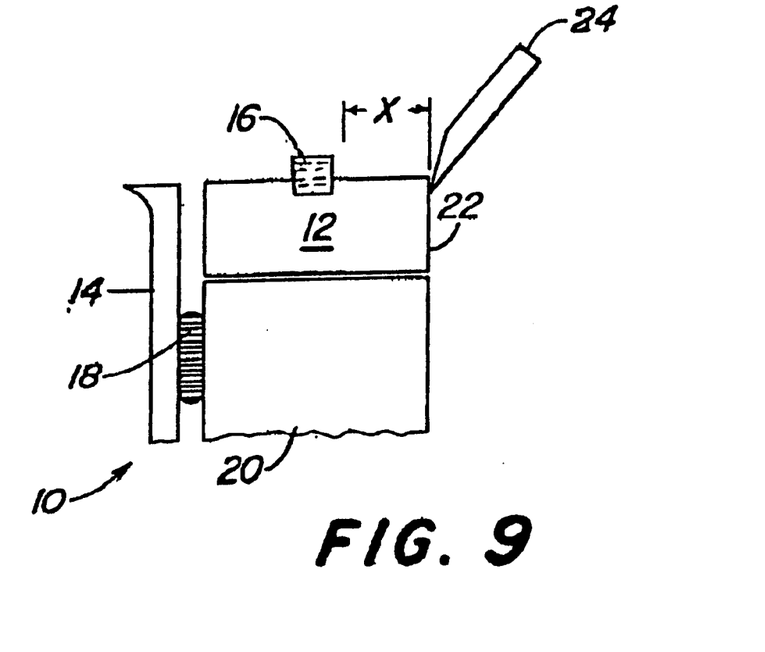
FIGS. 9 and 10 are similar to FIG. 1A, but illustrate alternative methods for mounting or attaching permanent magnets to the shearbar.
Figure 10:
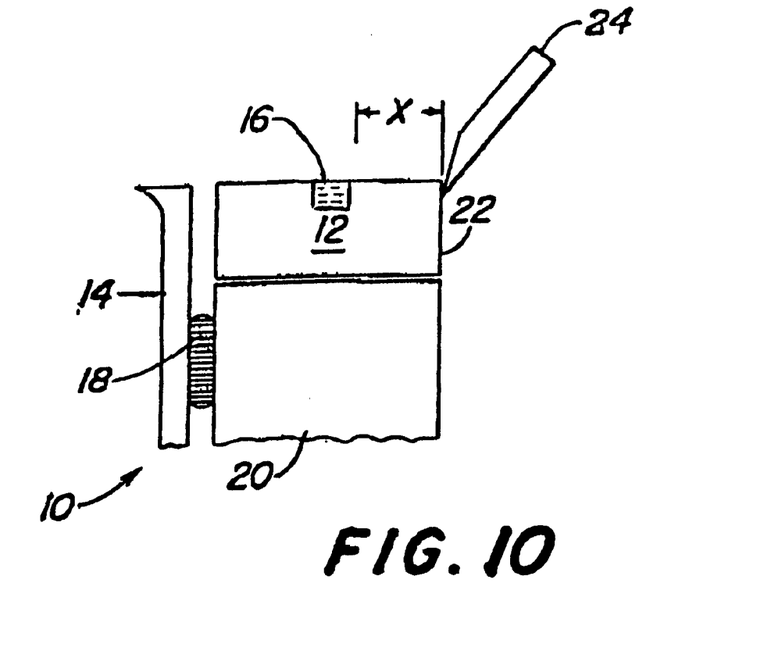

FIG. 1A shows a cutter device 10 which includes a shearbar 12 and one knife 24 of the plurality of knives of the cutterhead 142. Permanent magnets 16 are located on the shearbar 12 and, alongside them, an induction coil 18. The shearbar 12 is situated in a shearbar bed 20. The cylindrical permanent magnets 16 are arranged on the shearbar 12 with their side surfaces a distance x from the cutting surface 22 an equal distance from it. As shown in FIGS. 9 and 10, the magnets 16 can be partially or completely recessed into the surface of the shearbar 12. The induction coil 18 is located on the side of the shearbar 12 facing away from the cutting surface 22, between the shearbar 12 and a stripper sheet 14 alongside the shearbar bed 20. Thus, the magnets 16 are spatially separated from and exterior to the induction coil 18. As best seen in FIG. 1B, three permanent magnets 16 are located on the shearbar 12. Preferably, a permanent magnet and an induction coil may be placed along the shearbar opposite each knife row (not shown) of the cutterhead.

In operation, the knives 24 are passed by the cutting surface 22 and change the magnetic field generated by the permanent magnets 16. This change induces a voltage or sensor signal or pulse in the induction coil 18. This signal can be separated into a high frequency component and a low frequency component, the ratio of which is larger in absolute value the smaller the distance x is chosen to be. The stripper sheet 14 protects the induction coil 18 from cut material. In an alternative embodiment (not shown) a permanent magnets may be recessed into the cutting surface 22 of the shearbar 12, so that the surface of the permanent magnets opposite the knives is exposed.

Figure 2:
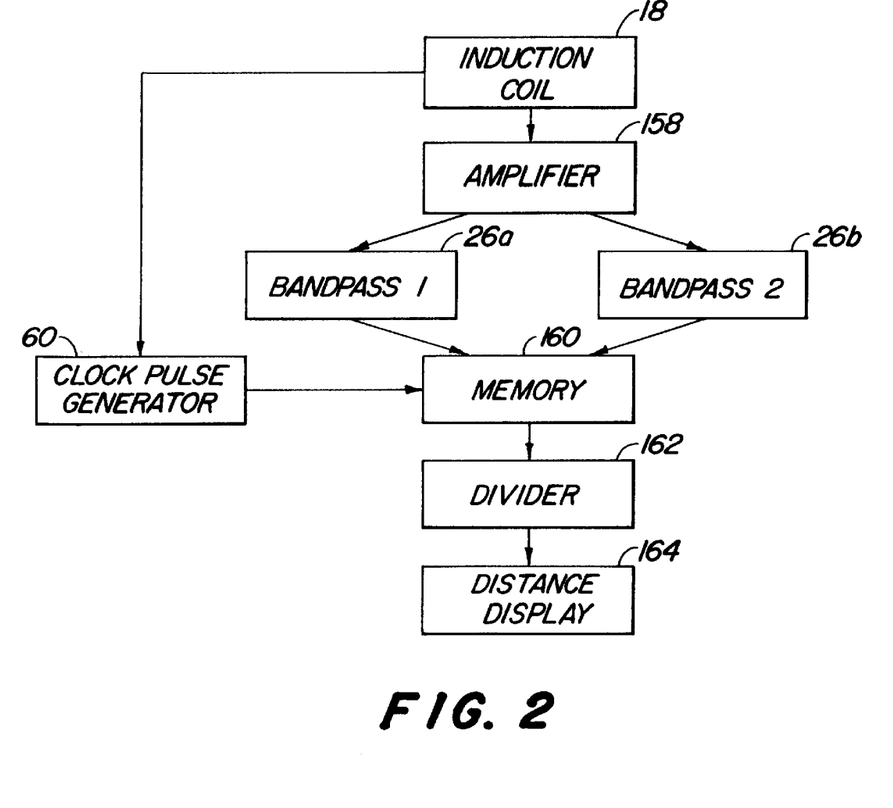
FIG. 2 is a schematic schematic diagram of an inductive distance measurement system.

The inductive distance measurement system is illustrated schematically in FIG. 2. The voltage pulse generated by the induction coil 18 is amplified by amplifier 158 and separated by means of two band-pass filters 26a, 26b into a high and a low frequency signal component. The two components are stored in memory 160 and divided by one another by divider 162, and the quotient is compared to a fixed voltage. The deviation of the quotient from the fixed voltage directly expresses the distance of knife 24 and shearbar 12 and can be made visible via a distance display 164. Loading and erasing the memory takes place in synchronization with the appearance of the voltage pulses.

Figure 3:
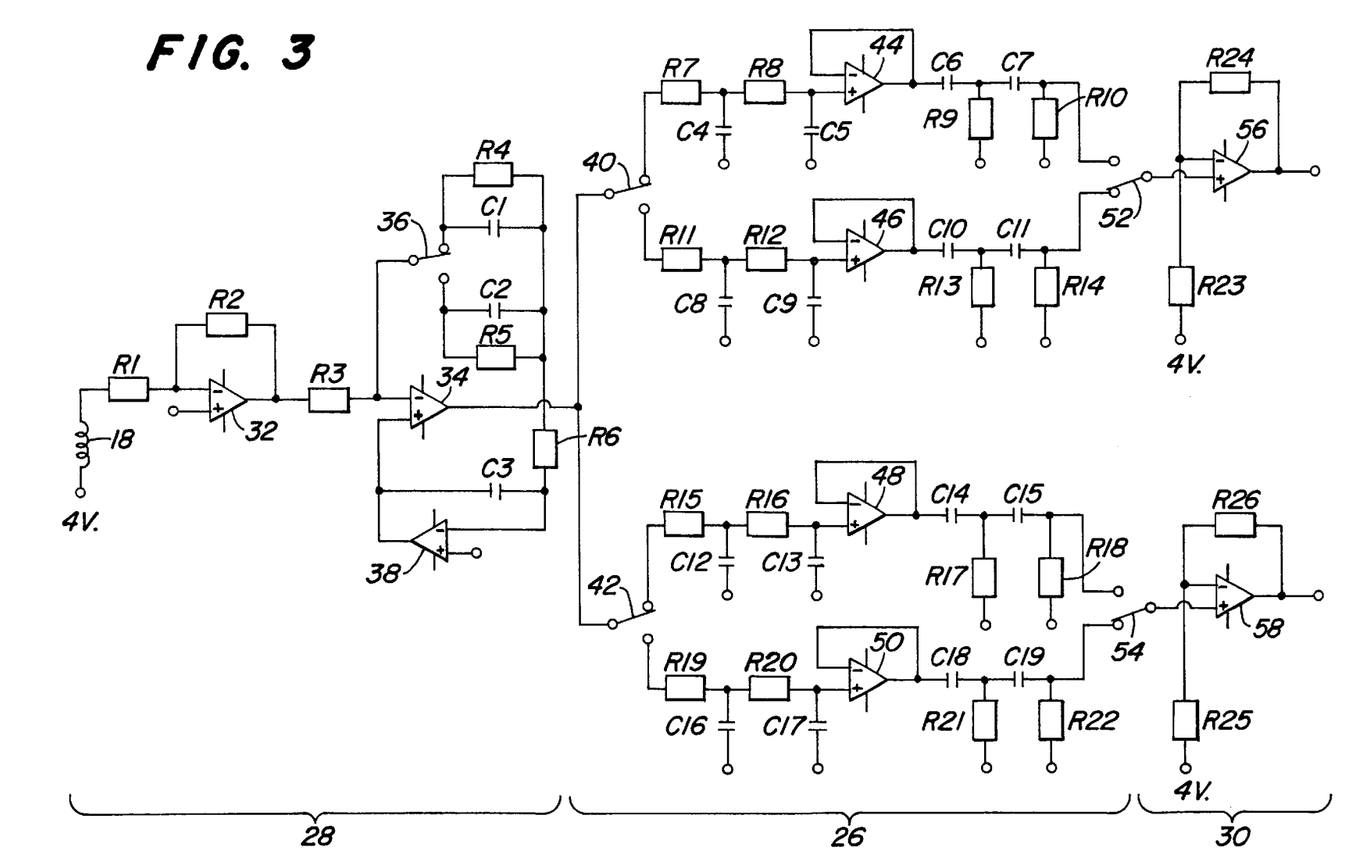
FIG. 3 is schematic diagram of an amplifier and filter circuit which generates a high frequency signal component and a low frequency signal component.

The entire amplifier and filter circuitry is more fully shown in FIG. 3. It contains a preamplifier unit 28, four band-pass filters 26 and a postamplifier 30. The preamplifier 28 is connected to the induction coil 18 and comprises three operational amplifiers 32,34,38, a switch 36, resistors R1 to R6 and capacitors C1 to C3. The band-pass filters 26 are equipped with switches 40,42,52,54 and comprise operational amplifiers 44,46,48 50, resistors R7 to R22 and capacitors C4 to C19. The postamplifier contains two operational amplifiers 56,58 and resistors R23 to R26.

An inverting amplifier, consisting of the operating amplifier 32 and the resistors R1,R2, and is preferably cast together with the coil 18. By "cast together" it is meant that a liquid plastics resin is poured over the coil 18 and the operational amplifier 32 and hardened, so that the coil and the amplifier are both contained in a single block. One end of the induction coil 18 is at a constant potential of 4 V and the other end is connected via the resistor R1 to the inverting input of the operational amplifier 32. The output of the latter is supplied back via the resistor R2 to its inverting input. The output of the operational amplifier 32 is connected via the resistor R3 to the inverting input of operational amplifier 34. Via the switch 36, its inverting input is connected to one of two parallel circuits of resistor R4 or R5 and capacitors C1 or C2, respectively, which are connected via resistor R6 to the inverting input of the operational amplifier 38 which is configured as an integrator. The latter's output is connected to the noninverting input of the operational amplifier 34. The capacitor C3 connects the inverting input and the output of operational amplifier 38. The output voltage of the operational amplifier 34 is supplied in each case via the switch 40 and 42 to one of two filter circuits. These are constructed identically and contain two low pass filters connected in series, consisting of the resistors R7(R11,R15,R19) and R8(R12,R16,R20), respectively, and the capacitors C4(C8, C12,C16) and C5(C9,C13,C17), respectively. The items in parentheses each refer to the other three circuits. Via the operational amplifier 44(46,48,50) configured as an impedance converter, the output voltage of the low pass filters is supplied to two high pass filters in series, consisting of the capacitors C6(C10,C14,C18) and C7(C11,C15,C19), respectively, as well as the resistors R9(R13,R17,R21) and R10(R14,R18,R22), respectively. Each low or high pass filter is composed of a pair of resistors and capacitors connected in series, between which the filtered signal is tapped. In the case of the low pass filters, the capacitors C4(C8,C12,C16) and C5(C9,C13,C17), respectively, and in the case of the high pass filters, the resistors R9(R14,R17, R21) and R10(R14,R18,R22), respectively, are connected at one end to the 4 V supply voltage. The output voltage of each of the four filter circuits can be supplied by the switch 52 and 54 to the noninverting input of an operational amplifier 56 or 58, respectively. The noninverting input is connected in each case via the resistor R23 or R25 to the 4 V voltage supply [in one place] and, in another, via the resistor R24 or R26, respectively, to the output of the operational amplifier 56 or 58.

The above described circuitry operates as follows. The amplification of the voltage pulse generated by the induction coil 18 is accomplished with the operational amplifier 32 configured as an inverting amplifier. The gain is given by the ratio R2/R1. In the second amplifier stage, which contains the operational amplifier 34 configured as an inverter, a low pass filtering occurs due to the capacitors C1 and C2 connected in parallel to resistors R4 and R5, so that high frequency electromagnetic interference in the cable supply lines is suppressed. Switch 36 permits selection between two cutoff frequencies defined by resistors R4,R5 and capacitors C1,C2. This is advantageous in case the knives 24 are moving at different speed, such as when the cutterhead 142 is rotated faster or slower. A compensation of the offset voltage is accomplished by the operational amplifier 38 configured as an integrator, in that the DC component of the signal generated by the induction coil 18 and amplified is made level at the noninverting input of the operational amplifier 34. The output voltage of the operational amplifier 34 is supplied to the band-pass filters 26 and thus the signal is separated into a high frequency component and a low frequency component. The switches 40 and 42 serve to activate band-pass filters 26 with different cutoff frequencies for different relative velocities between knife 24 and shearbar 12. The band-pass filters 26 each contain a second order low and high pass filter, which are separated by an operational amplifier configured as an impedance converter 44(46,48,50). The impedance converter acts as a buffer between the successive low and high pass filters. In order for the band-pass filters 26 to always operate in the optimal frequency range, an adjustment of the cutoff frequencies as a function of the relative velocity between knife 24 and shearbar 12 is necessary, which is possible for two relative velocities in the illustrated example of FIG. 3. In an additional amplifier stage, the output voltages of the band-pass filters 26 are supplied by the switches 52 and 54 to operational amplifiers 56 and 58 configured as noninverting amplifiers. Their output voltages represent the low and high frequency signal components which are stored.

Figure 4:
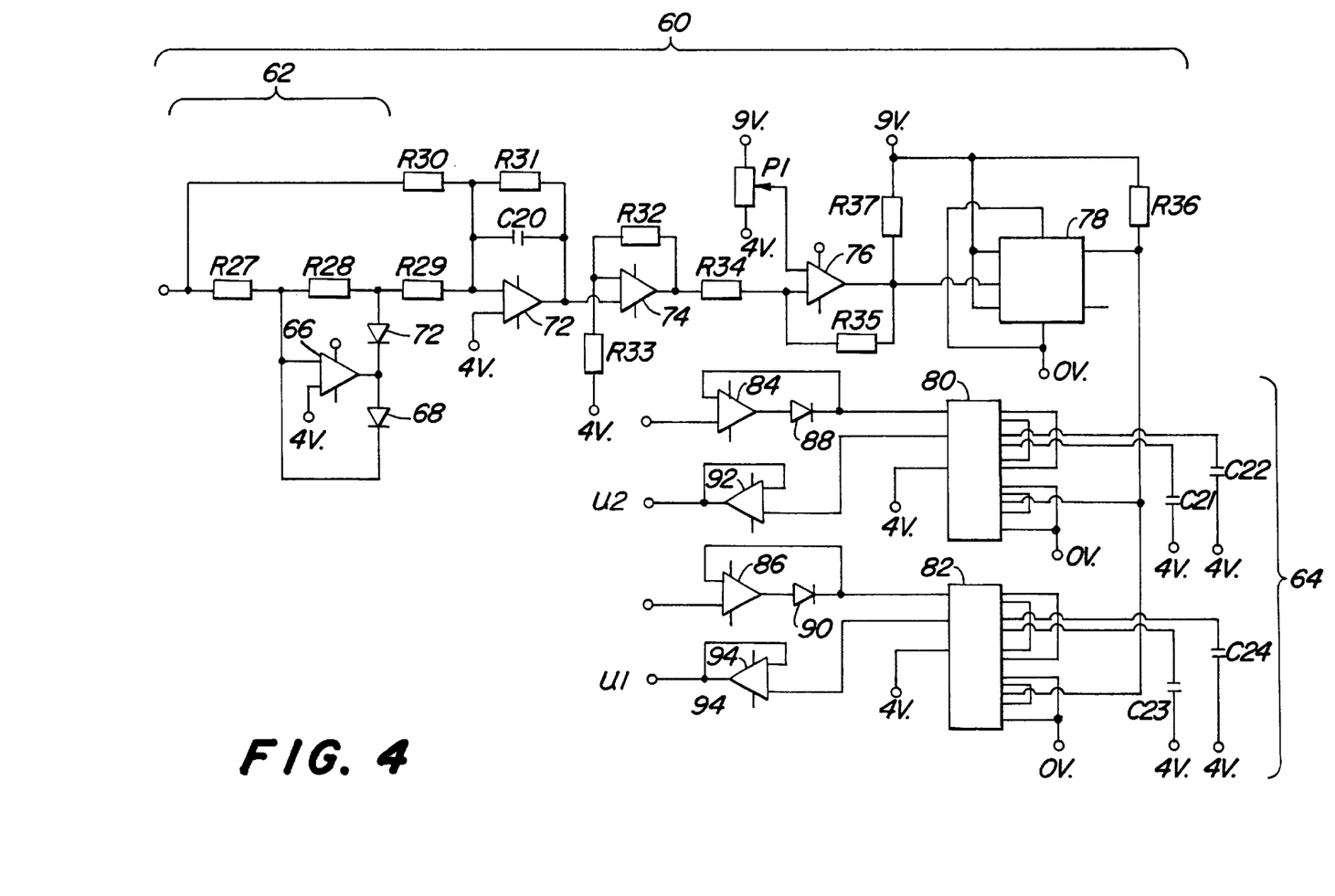
FIG. 4 is a schematic diagram of a circuit for storing the filtered high and low frequency signal components of FIG. 3.

The circuitry for storing the high and low frequency signal components is shown in FIG. 4. It includes clock signal generator 60 connected to signal storage components 64. The voltage signal generated by the induction coil 18 is present at the input of the clock signal generator 60. This voltage signal is supplied to a full-wave rectifier 62, comprising the two operational amplifiers 66 and 72, two diodes 68 and 70, two identical resistors R27 and R28 and resistors R29 to R31, as well as a capacitor C20. The clock signal generator 60 also includes operational amplifiers 74 and 76, resistor R32 to R37, a potentiometer P1 and a flip-flop 78. The storage device comprises two analog multiplexers 80 and 82, such as a commercially available integrated circuit CD4053, with outputs Y (not labeled) as well as with inputs X, Z, X0, X1, Y0, Y1, Z0, Z1, INH, A, B, C and VEE (not labeled) connected as described later. Additionally, it contains four operational amplifiers 84,86,92 and 94, two diodes 88 and 90 and four capacitors C21 to C24.

The full-wave rectifier 62 includes the operational amplifier 66, whose output is connected to the anode of diode 68 and the cathode of diode 70. Diode 68 is connected at its other end to the inverting input of the operational amplifier 66. The anode of diode 70 is in turn connected, in one place, via the resistor R28 to the inverting input of the operational amplifier 66 and, in another, via the resistor R29 to the inverting input of the operational amplifier 72. Between the output and the inverting input of the operational amplifier 72, there is a parallel circuit consisting of the capacitor C20 and the resistor R31. To it is fed, via resistor R30, the signal generated by the induction coil 18. The latter signal is also present, via resistor R27, at the inverting input of the operational amplifier 66. The resistors R30 and R31 are twice as large as R29. The output of operational amplifier 72 is connected to the noninverting input of the operational amplifier 74. The output of this operational amplifier 74 is supplied back via the resistor R32 to the inverting input and connected via the resistor R33 to the 4 V supply voltage. The output voltage of the operational amplifier 74 is present via the resistor R34 at the noninverting input of an operational amplifier 76 configured as a comparator. The voltage generated by a potentiometer P1 is communicated to the inverting input of operational amplifier 76. The potentiometer P1 is located in a circuit whose ends are at constant potential of 4 V or 9 V. The output of operational amplifier 76, in one place, is supplied back, to its noninverting input via resistor R35 and in another, controls the "clock" input CLK of flip-flop 78. The J and K inputs of the flip-flop 78 are connected together and, in one place are attached to a 9 V supply voltage and in another are connected to the Q output of flip-flop 78 via the resistor R36. Also wired to the 9 V supply voltage is the output of the operational amplifier 76, via resistor R37. The "Set" and "Reset" inputs of the flip-flop 78 are at 0 V.

The inputs INH and VEE (not shown) of the analog multiplexers 80 and 82 are grounded, while the inputs X0, Y0 and Z0 (not labeled) as well as X1, Y1 and Z1 (not labeled) are, respectively, connected to one another and to the 4 V supply voltage via capacitors C21 and C22 or C23 and C24, respectively. The Z inputs (not labeled) are at the same potential. The A, B and C inputs (not labeled) of the two analog multiplexers 80 and 82 are each connected together and to the Q output of flip-flop 78 and the X inputs (not labeled) are connected to the inverting inputs of the operational amplifiers 84 and 86 and are connected to their outputs via diodes 88 and 90, respectively. The anodes of diodes 88 and 90 are at the outputs of operational amplifiers 84 and 86, respectively. The Y outputs (not labeled) of the analog multiplexers 80 and 82 are connected to the noninverting input of two operational amplifiers 92 and 94, respectively, whose outputs are supplied back to the inverting inputs.

Figure 5:
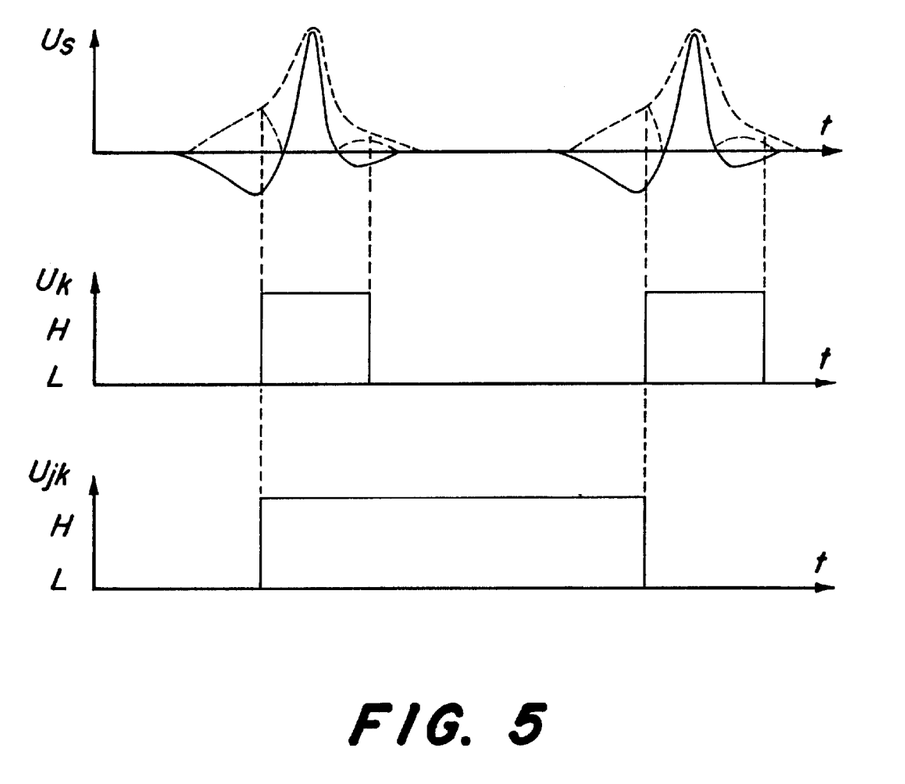
FIG. 5 is a signal diagram illustrating the pulse shapes before and after the generation of a clock signal from the voltage pulse generated by the induction coil.

The control of the analog multiplexers 80 and 82 is accomplished in sync with the sensor signal generated by the coil 18. Prior to the main pulse of the sensor signal, a negative edge appears, as shown in FIG. 5. Since the low and high frequency signal components are formed by the main pulse, controlling of the multiplexers 80 and 82 can be accomplished with the negative edge. To that end, the absolute value of the voltage pulse is generated with the device for full wave rectification 62, which contains the operational amplifier 66. With a positive input voltage, the operational amplifier 66 operates as an inverting amplifier. Consequently, its output voltage is negative, so that the diode 70 is conductive and feeds back the output voltage of the operational amplifier 66 via the resistor R28. This results in a gain of −1. The operational amplifier 72 is likewise configured as an inverting amplifier so that, for the resistance ratio R31/R29=R30/R29=2, an output voltage at operational amplifier 72 results which is equal to the voltage generated by the induction coil 18. In case the input voltage is negative, the diode 68 becomes conductive. The operational amplifier 66 is supplied back directly and has a gain of 0. Accordingly, the absolute value of the voltage pulse generated by the induction coil 18 results at the output of the operational amplifier 72 operated in an inverting mode. The low pass filter formed from capacitor C20 and resistor R31 bridges the voltage breakdown between inverted negative edge and the main part of the voltage pulse, so that an unintended generation of two clock pulses by the downstream comparator is avoided. The comparator contains an operational amplifier 76 configured for inverting, the inverting input of which is supplied with a reference voltage generated by a potentiometer P1. This serves to provide a positive voltage pulse at the output of the comparator when the edge of the voltage pulse generated by induction coil 18, negative prior to rectification, has largely decayed. This function is illustrated by FIG. 5. Us is the voltage pulse before rectification (solid line) and after rectification (dash line). The dotted line shows the signal that would be obtained without low pass filtering. $U_k$ is the output voltage of the comparator, which is applied to the clock input CLK of flip-flop 78. The flip-flop 78 is reset by the rising edge of the subsequent voltage pulse at the output of the comparator. The output of flip-flop 60 is the clock signal for signal storage and is labeconnected $U_{jk}$ in FIG. 5. H and L designate the "HIGH" and "LOW" levels.

Signal storage is implemented with two analog multiplexers 80 and 82 for the high and low frequency signal components. They each contain three channel changeover switches. The switch settings are selected by way of the control inputs A, B, C (not shown) of the multiplexers. Since only the output of flip-flop 78 is available as a control signal, the control inputs A, B, C are connected together. With each "HIGH" level at the control inputs A, B, C, one of the capacitors C21 or C22 and C23 or C24 is charged and the respective other one is discharged. By using two of capacitors C21 and C22 or C23 and C24 in each case, it is guaranteed that the charging process is not covered up by the discharging process, and thus that successive voltage pulses can be clearly separated one from another. By connecting inputs INH and VEE (not labeled) to ground, the analog multiplexers 80 and 82 are always active. The high and low frequency signal components are buffered by the analog multiplexers 80 and 82 by means of the operational amplifiers 84 and 86 connected as impedance converters. Diodes 88 and 90 prevent discharging of capacitors C21 to C24 by way of the outputs of operational amplifiers 84 and 86. The signal outputs Y of the analog multiplexers 80 and 82 are decoupled with the operational amplifiers 92 and 94 connected as impedance converters from downstream electronic components. At the outputs of operational amplifiers 92 and 94 are voltages corresponding to the high and low frequency voltage pulses u1 and u2, which are connected to an analog divider circuit.

Figure 6:
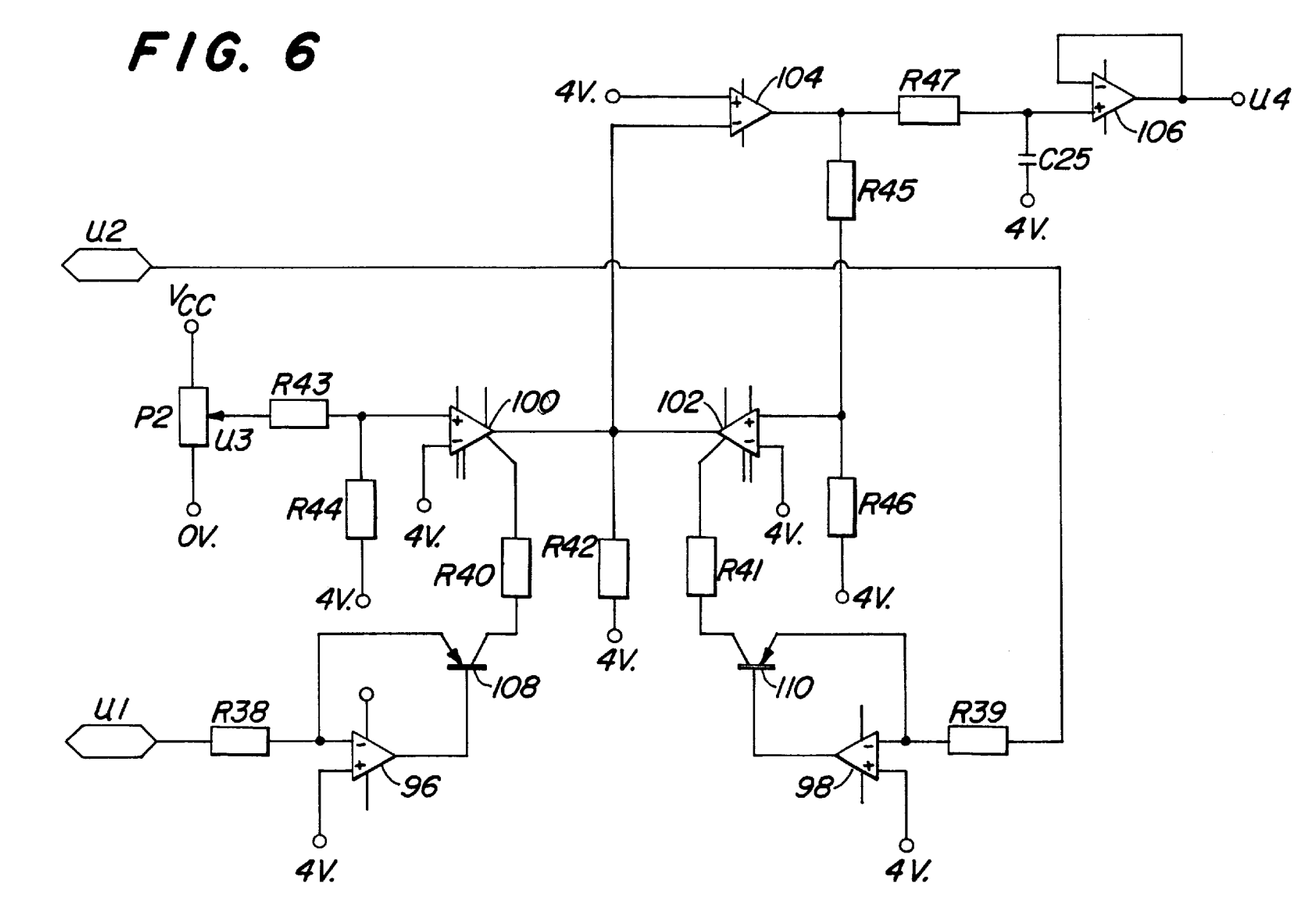
FIG. 6 is a schematic diagram of an analog divider circuit.

The analog divider circuit is shown in FIG. 6. It contains four operational amplifiers 96, 98, 104, 106, two Operational Transconductance Amplifiers (OTA) 100 and 102, such as a CA3080 integrated circuit, as well as two pnp transistors 108 and 110, resistors R38 to R47, a capacitor C25 and a potentiometer P2.

The noninverting inputs of operational amplifiers 96 and 98 are connected to the 4 V supply voltage. The inverting inputs are supplied by the high and low frequency signal components of the analog multiplexers 80 and 82, which drop over resistors R38 and R39. The output voltage of the two operational amplifiers 96 and 98 is present at the base of the pnp transistors 108 and 110, respectively, the emitters of which are connected to the inverting input of operational amplifier 96 and 98, respectively. The collector of the pnp transistor 108 or 110 is connected, respectively, via resistor R40 or R41 to input 5 of OTA 100 or 102. The outputs of OTA 100 and 102 are connected together in a node which, in one place is connected via a resistor R42 to the 4 V voltage source and, in another, is connected to the inverting input of operational amplifier 104. The latter's noninverting input is at a constant potential of 4 V. The noninverting inputs of OTA 100 and 102 are connected to voltage dividers. The voltage dividers include, respectively, resistors R43 and R44 or R45 and R46. The resistors R44 and R46 are connected to the 4 V supply voltage. A voltage between 0 V and a voltage VCC is generated by a potentiometer P2 via the resistor R43. Resistor R45 is connected directly to the output of operational amplifier 104 and a low pass filter consisting of a resistor R47 and a capacitor C25. The low pass filter is connected at its output to the noninverting input of operational amplifier 106 and the capacitor C25 is connected at one end to the 4 V supply voltage. The output of operational amplifier 106 is supplied back to its noninverting input.

Voltages u1 and u2 corresponding to the high and low frequency voltage pulses of the signals are supplied to the inverting inputs of operational amplifiers 96 and 98 via the resistors R38 and R39. The voltage pulses are converted by the pnp transistors into current pulses, which control the output current of OTA 100 and 102. If one takes into account that the sum of all currents is zero at the node where the outputs of OTA 100 and 102 are joined, one obtains (for equal housing temperatures of OTA 100 and 102) a voltage at the output of operational amplifier 104 which is proportional to the voltage u3 generated by the potentiometer P2 and the ratio of the voltages u1 and u2. The gain of the analog divider can be adjusted with the voltage u3. The voltage u3 must lie between 0V and +1 V in order to avoid distortion. In the time between the charging and the discharging of the storage capacitors of analog multiplexers 80 and 82, the voltages are u1=u2=0 V. In this time section, voltage peaks which are suppressed by the low pass filter consisting of resistor R47 and capacitor C25 occur in the division. Downstream of the low pass filter there is an impedance converter, consisting of the operational amplifier 106, whose output voltage is supplied to a monitoring device.

Figure 7:
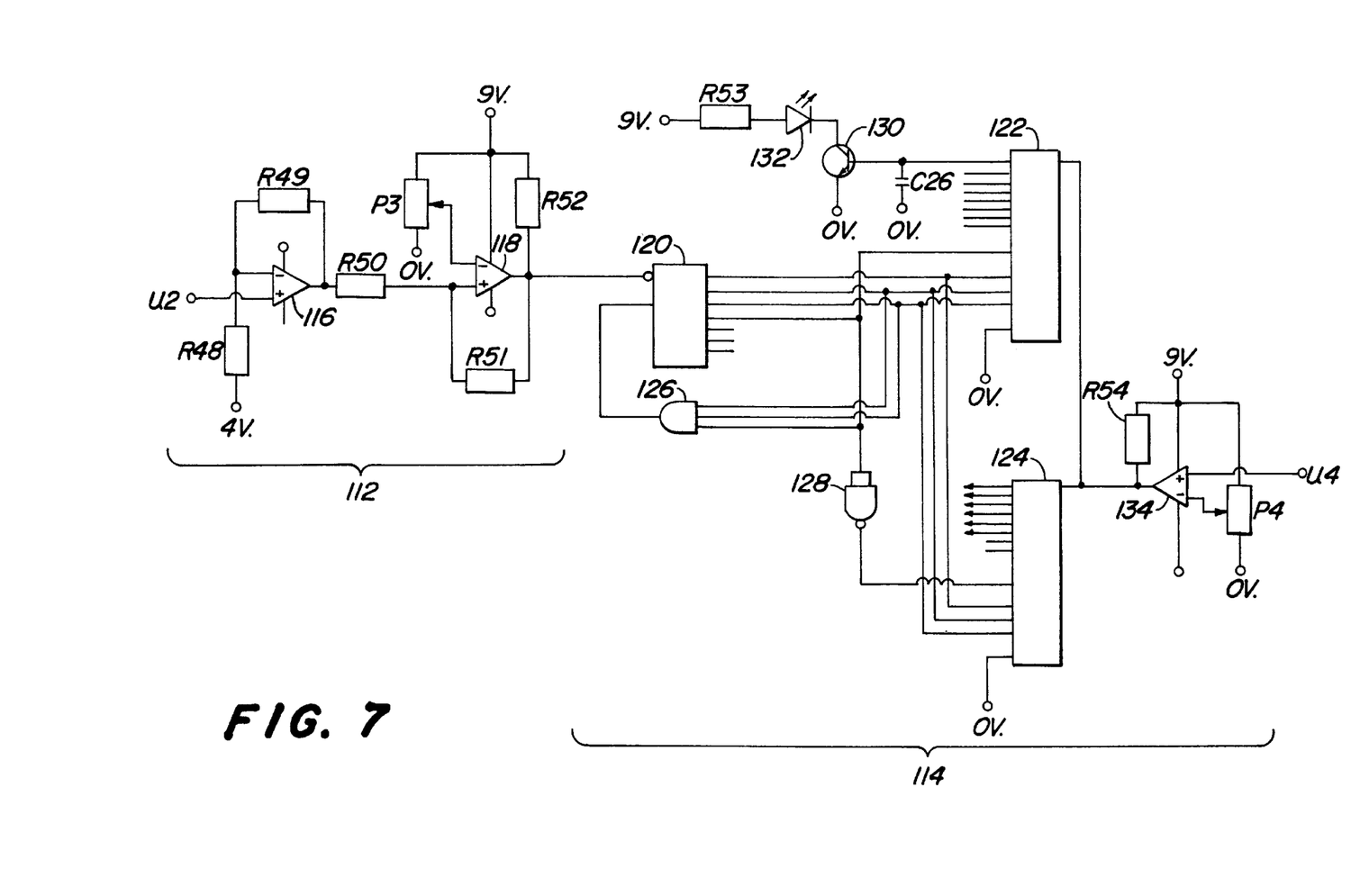
FIG. 7 is a schematic diagram of circuit for distance monitoring.

Referring now to FIG. 7, the distance monitoring circuit includes a clock pulse generator 112 as well as a circuit 114 for triggering light-emitting diodes LEDs 132. The clock pulse generator includes an operational amplifier 116 and an operational amplifier 118 configured as a comparator, as well as resistors R48 to R52 and a potentiometer P3. The circuit 114 LEDs 132 includes a counter 120, such as a commercially available integrated circuit CD4024, as well as two analog multiplexers 122 and 124, such as a commercially available integrated circuit CD4051. It also includes a three-input AND gate 126 and an inverter 128. The counter 120 possesses a clock input CLK and a reset input RST as well as outputs Q1 to Q7 (not labeled). The analog multiplexers 122 and 124 each have outputs X0 to X7, as well as inputs A, B, C, VEE, INH and X (not labeled). The unit further comprises fourteen LEDs 132, as well as 14 capacitors C26, a resistor R54, 14 resistors R53, an operational amplifier 134 and a potentiometer P4.

The voltage pulse u2, corresponding to the low frequency signal component, is present at the noninverting input of operational amplifier 116. Its inverting input is connected, via resistor R48, to the 4 V supply voltage and, via resistor R49 to the output of operational amplifier 116. The latter is in connected via resistor R50 with the noninverting input of operational amplifier 118. This input is also connected via resistor R51 to the output of operational amplifier 118. The latter is connected via resistor R52 to the 9 V voltage supply. The latter is also connected to ground via the potentiometer P3. A voltage which is supplied to the inverting input of comparator 118 is tapped at the potentiometer P3.

The output of comparator 118 is connected to the clock input CLK of counter 120. The outputs Q1, Q2 and Q3 of counter 120 are supplied to the inputs A, B and C of the two analog multiplexers 122 and 124. The outputs Q2 and Q3 of counter 120, as well as the INH input of the analog multiplexer 122 are connected to the inputs of the three-input AND gate 126. Its output is connected with the input RST of counter 120. The output Q4 of counter 120 is supplied to the inverter 128. Its output is connected to the INH input of the second analog multiplexer 124. The VEE inputs of the two analog multiplexers 122 and 124 are connected to ground. The outputs X0 to X7 of analog multiplexer 122 and the outputs X0 to X5 of analog multiplexer 124 are connected to the base of a respective Darlington transistor 130. This is grounded in each case by means of capacitor C26. The emitter of the Darlington transistor 130 is at ground potential and the collector is connected in each case via the light-emitting diode 132 and the resistor R53 to a 9 V voltage supply. The output voltage u4 of the analog divider shown in FIG. 6 is supplied to the noninverting input of the operational amplifier 134 configured as a comparator, the inverting input of which is in contact with a potentiometer P4. This is connected to ground and via a resistor R54 to the output of operational amplifier 114 and the X inputs of analog multiplexers 122 and 124.

The circuit of FIG. 7 is designed for monitoring the distance of successive knives 24. An LED 132 is assigned to each of these knives 24. The generation of a clock signal for the counter 120 is accomplished by means of the voltage pulse corresponding to the low frequency signal component, which is amplified with operational amplifier 116. The amplified voltage pulse is compared at comparator 118 to a voltage picked off of potentiometer P3. The selection of LEDs 132 is accomplished by means of counter 120, the initiation of which is accomplished with the output voltage of comparator 118 by way of the CLK input. The counter 120 is configured as a 7-bit counter, a reset occurring at counter state 15. There must also be a HIGH signal at its RST input. In order to activate the analog multiplexers 122 and 124, their INH inputs must be LOW. Up to counter state 8, Q4 is low and thus the analog multiplexer 122 is active. At counter state 9, Q4 is HIGH, so that analog multiplexer 122 is inactive and analog multiplexer 124 becomes active by virtue of inverter 128. With the simultaneous jump of the Q2, Q3 and Q4 outputs from LOW to HIGH level, the counter 120 is restarted via the 3-input AND gate 126 and the RST input. The outputs X0 to X7 or X0 to X5, respectively of analog multiplexers 122 and 124 each control the base of a Darlington transistor 130. The Darlington transistors 130 serve as drivers for the LEDs 132. The capacitors C1 on the bases of the Darlington transistors prevent an immediate turning-off of the LEDs 132. The maximum current through the LEDs 132 is limited by the resistors R53. The X inputs of analog multiplexers 122 and 124 are connected to the output of operational amplifier 134 configured as a comparator. Here the reference voltage at the inverting input of operational amplifier 134, which is generated by way of the potentiometer P4, serves as the comparison voltage for distance measurement. The output voltage u4 of the analog divider is present at the noninverting input of operational amplifier 134. If the output voltage u4 of the analog divider exceeds the comparison voltage, the light-emitting diode 132 assigned to the corresponding knife 24 lights up. In this way, it can be determined whether one of the knives 24 passes below a defined minimum distance from the shearbar 12. By inverting the voltage present at the output of operational amplifier 134, an extremely large distance of the knives 24 from the shearbar 12, for instance, after heavy wear, can be determined.

The components of the evaluation circuit, such as the clock pulse generator, the band-pass filters 26 or signal memories, can also be configured in a different form in order to implement the inductive distance measurement system illustrated by FIG. 2. For example, other passive or active filters of higher order can be employed and signal storage can be initiated in principle by pulses that originate from a timer connected to the rotating cutterhead and are independent of the signals received at the induction coil. In case of the use of other electronic components, for instance, operational amplifiers, the supply voltages must be appropriately adapted.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example, the above-described system can also be implemented with a digital system, in which case, the amplified signals would be converted into digital signals. Also, the invention could be applied to any cutting device which contain at least one knife and a shearbar, such as chopping devices for vegetables and tobacco, machines for cutting metals, etc. Also, the invention could be used to monitor the distance between the rollers of a post-treatment device. In the machine tool field, the invention can be used to monitor the distance between a shearing blade and a support, or in connection with other cutting devices, such as are used to cut tobacco, vegetables, etc. Furthermore, the wear on buckets of a bucket conveyor could be detected by a distance measurement as they slide past a reference point. Thus, the invention is applicable in any situation where two parts are movable relative to one another and the part to which the distance is to be measured consists of magnetically conductive material.

We claim:

1. A system for monitoring a distance between a magnetically conductive knife member which is movable relative to a magnetically conductive shearbar, the system having a permanent magnet and an induction coil for generating an electric signal corresponding to the distance and which is supplied to an evaluation circuit, the improvement wherein:

the permanent magnet is spatially separated from and exterior with respect to the induction coil, and the permanent magnet is placed a distance from a cutting surface of the shearbar on an outer surface of said shearbar.

2. The monitoring system of claim 1, wherein:

a plurality of permanent magnets are placed a distance from a cutting surface of the shearbar on an outer surface of said shearbar.

3. The monitoring system of claim 1, wherein:

said magnet is at least partially received by a recess formed in the shearbar.

4. The monitoring system of claim 1, wherein:

the signal generated by the induction coil is amplified by an amplifier and separated into a high frequency component and a low frequency component.

5. The monitoring system of claim 1, wherein:

the signal generated by the induction coil is separated into a high frequency component and a low frequency component by filters, said filters having cutoff frequencies which are dependent on a velocity of the knife relative to the shearbar.

6. The monitoring system of claim 5, wherein:

the filters comprise band-pass filters.

7. The monitoring system of claim 1, wherein:

the signals generated by the induction coil comprise voltage pulses; and said high and low frequency signal components are stored in a peak value memory in synchronization with said voltage pulses.

8. The monitoring system of claim 1, wherein:

the evaluation circuit comprises a divider circuit which forms a quotient of the high and low frequency signal components.

9. The monitoring system of claim 8, wherein:

the evaluation circuit includes a comparator which compares an output voltage of the divider circuit to a comparison voltage, and an adjuster for adjusting said comparison voltage.

10. The monitoring system of claim 9, wherein:

the evaluation circuit generates a warning signal if the output voltage of the divider deviates by a defined amount from the comparison voltage.

11. The monitoring system of claim 1, wherein:

the knife is one of a plurality of knives of a rotating cutterhead of a forage harvester.

12. The monitoring system of claim 11, wherein:

the knives are arranged in knife rows on the cutterhead, a permanent magnet and an induction coil is placed along the shearbar opposite each knife row.

13. A system for monitoring a distance between a magnetically conductive knife member movable with respect to a magnetically conductive shearbar, the system having a permanent magnet and an induction coil for generating an electric signal corresponding to said distance, characterized by:

a circuit for separating said signal into a high frequency component and a low frequency component and for forming a quotient from said components.

14. The monitoring system of claim 13, wherein a plurality of permanent magnets are placed a distance from a cutting surface of the shearbar on top of or under the shearbar.

15. The monitoring system of claim 13, wherein a plurality of permanent magnets are placed a distance from a cutting surface of the shearbar at least partially recessed into said shearbar.

16. The monitoring system of claim 13, wherein:

the signal generated by the induction coil is separated into a high frequency component and a low frequency component by filters, said filters having cutoff frequencies which are dependent on a velocity of the knife relative to the shearbar.

17. The monitoring system of claim 16, wherein:

the filters comprise band-pass filters.

18. The monitoring system of claim 13, wherein:

the signals generated by the induction coil comprise voltage pulses; and said high and low frequency signal components are stored in a peak value memory in synchronization with said voltage pulses.

19. The monitoring system of claim 13, wherein:

the evaluation circuit comprises a divider circuit which forms a quotient of the high and low frequency signal components.

20. The monitoring system of claim 19, wherein:

the evaluation circuit includes a comparator which compares an output voltage of the divider circuit to a comparison voltage, and an adjuster for adjusting said comparison voltage.

21. The monitoring system of claim 20, wherein:

the evaluation circuit generates a warning signal if the output voltage of the divider deviates by a defined amount from the comparison voltage.

22. The monitoring system of claim 13, wherein:

the knife member is one of a plurality of knives of a rotating cutterhead of a forage harvester.

* * * * *